T. V. BUCKWALTER.
ANTIFRICTION BEARING.
APPLICATION FILED MAY 18, 1917.

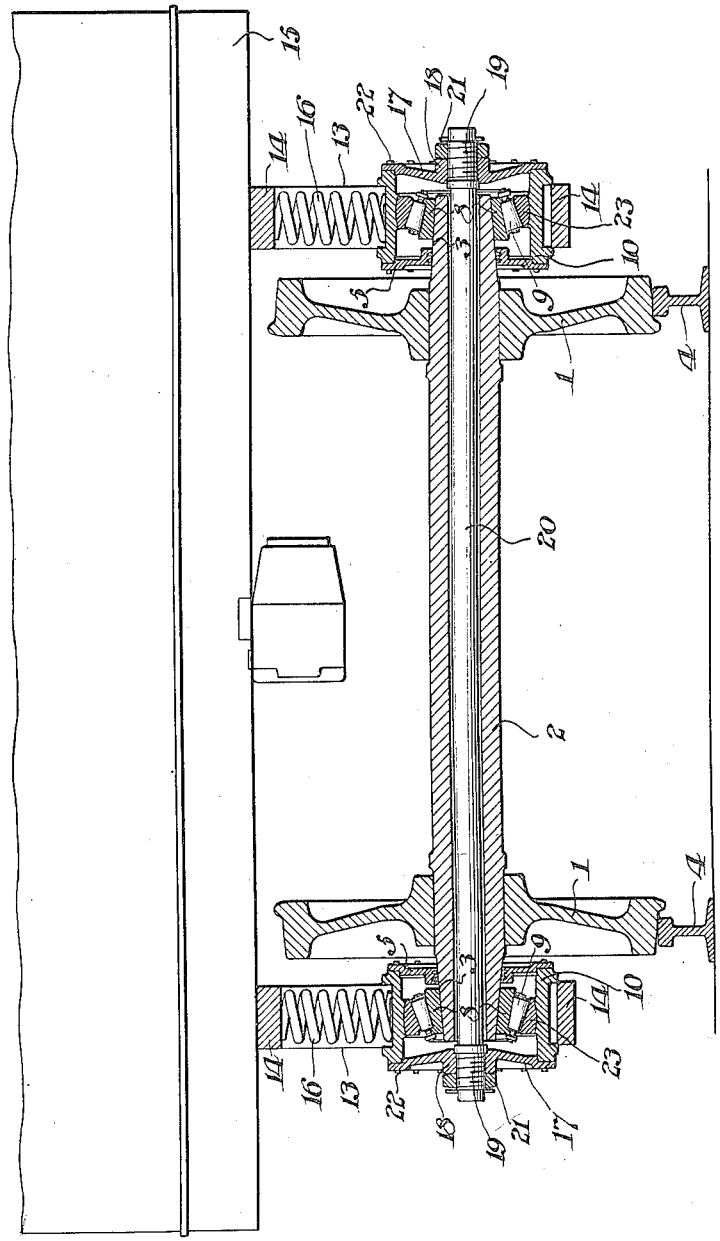

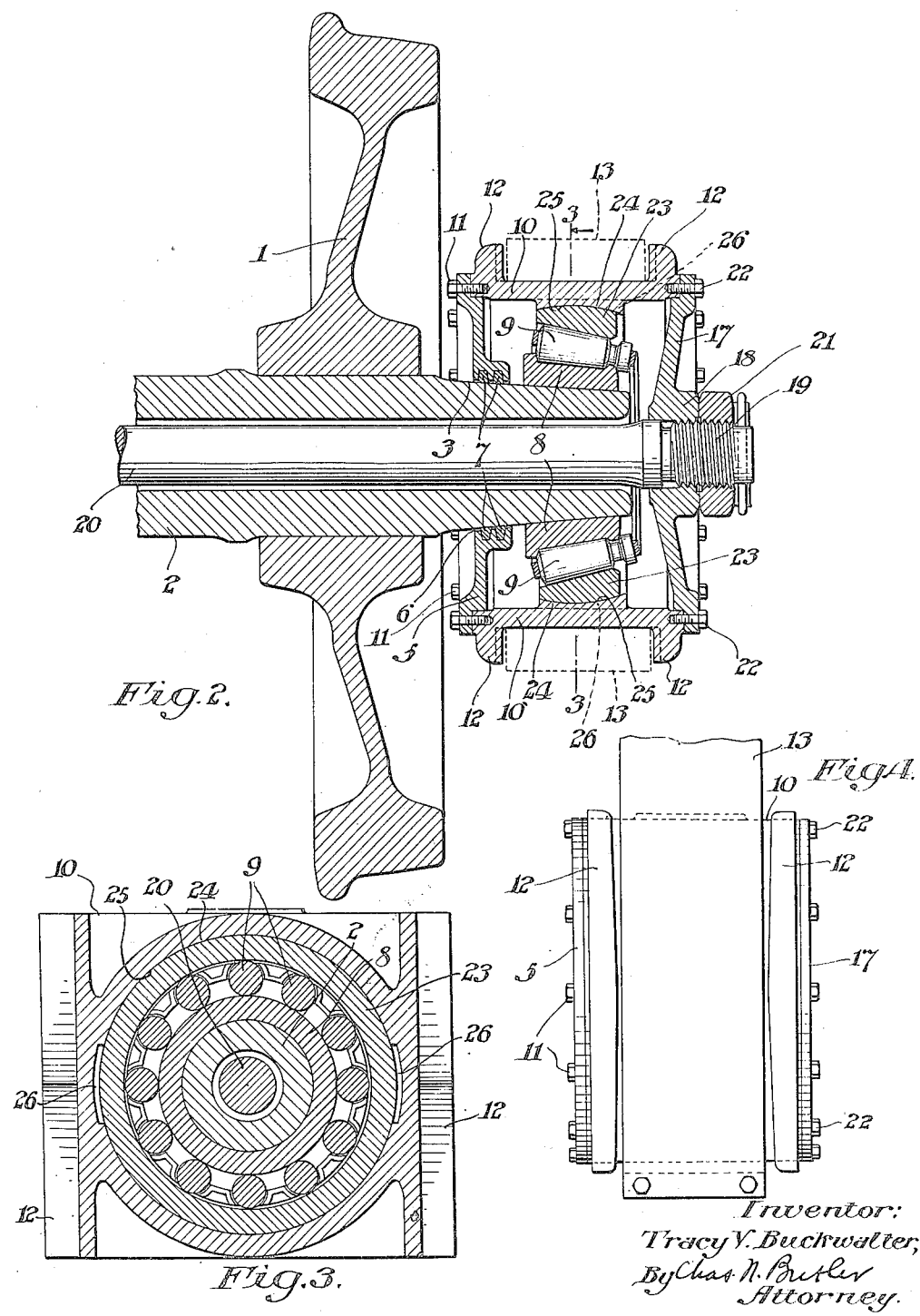

1,247,928.

Patented Nov. 27, 1917.
4 SHEETS—SHEET 4.

Inventor:
Tracy V. Buckwalter,
By Chas. N. Butler
Attorney.

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

ANTIFRICTION-BEARING.

1,247,928.  Specification of Letters Patent.  Patented Nov. 27, 1917.

Application filed May 18, 1917. Serial No. 169,409.

*To all whom it may concern:*

Be it known that I, TRACY V. BUCKWALTER, a citizen of the United States, residing at Canton, in the county of Stark and State of Ohio, have invented certain Improvements in Antifriction Bearings, of which the following is a specification.

This invention relates to improvements in anti-friction bearings whereby such bearings are adapted to be applied between the power and work, and especially between traction wheels and their load, for the purpose of reducing friction by efficient means that are self adjusting to maintain the desired relations regardless of eccentric movements of the connected parts and manually adjustable to set the parts in the desired co-acting relations initially and in compensation for wear. Important desiderata obtained are the rectification and absorption of torsional and axial stresses, resulting from oscillations of the parts connected with the bearings and the thrusts due to lateral forces, and the proper distribution of the load, an important feature being the use of means for taking thrust between opposite bearings. Further desiderata result from the peculiar connections between the wheels and the frames through journal boxes which inclose and permit the ready adjustments of the bearings. Further desiderata result from the combinations by which the wear is distributed and the life of the parts prolonged.

The characteristic features of my improvement are disclosed in the following description and the accompanying drawings illustrating the same.

Figure 5:
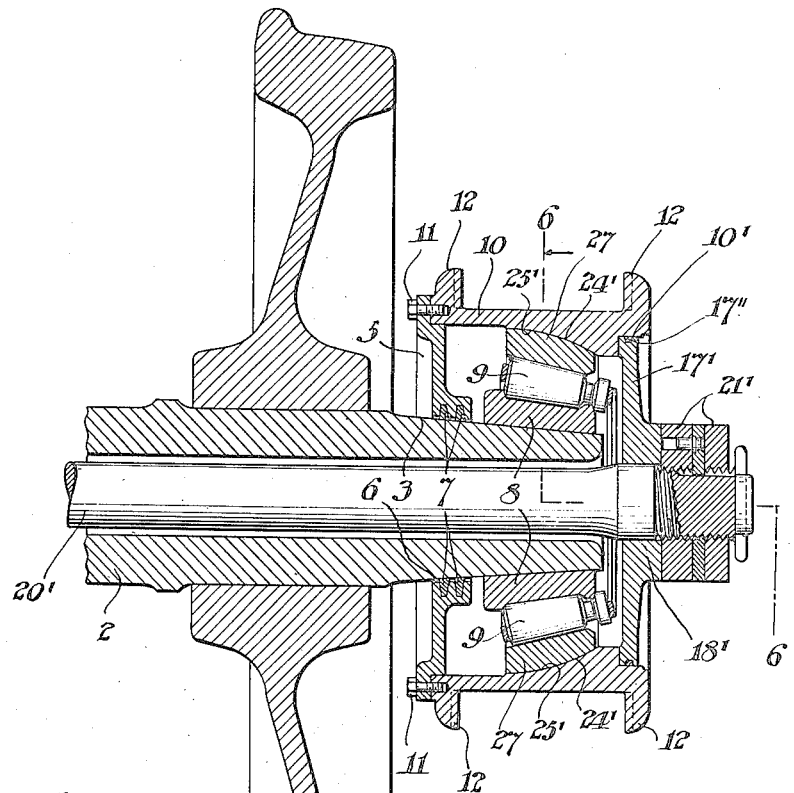
Figure 6:
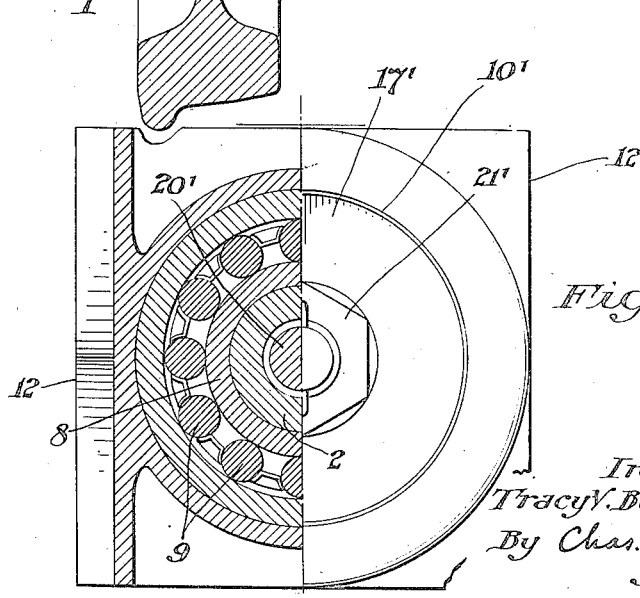
Figure 7:
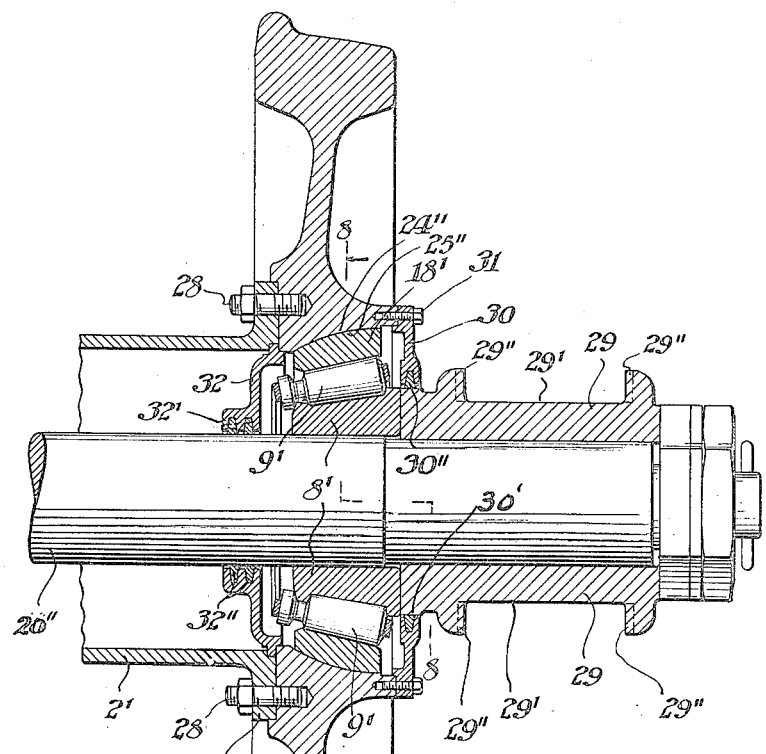
Figure 8:
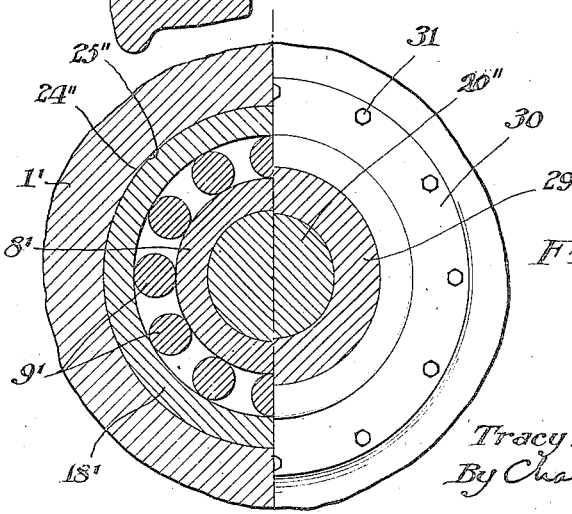

In the drawings, Figure 1 is a part sectional elevation of mechanism embodying my invention; Fig. 2 is an enlarged view taken axially through a car wheel in illustration of details of the bearing shown in Fig. 1; Fig. 3 is a sectional view taken on the line 3—3 of Fig. 2; Fig. 4 is a side view of a broken pedestal with a journal box therein; Fig. 5 is a sectional view taken axially through a second form of my improvements; Fig. 6 is a part elevation and sectional view on the line 6—6 of Fig. 5; Fig. 7 is a sectional view taken axially through a third form of my improvements; and Fig. 8 is a sectional view taken on the line 8—8 of Fig. 7.

As illustrated in Figs. 1 to 6 inclusive, the invention is embodied in a construction comprising the car wheels 1 fixed on a hollow axle 2 having the tapered ends 3, the wheels being carried by the rails 4. Plates 5, containing apertures 6 and having the felt washers or packing rings 7 set therein, are placed on the tapered ends of the axle with the rings in contact therewith, and oppositely disposed bearing cones 8, tapering in the direction of the tapered ends of the axle, are fixed thereon, the cones carrying respective sets of conical rollers 9 tapered outwardly.

Box or housing bodies 10 are fixed at their inner edges to the plates or box ends 5 by the bolts 11 and are provided with the side flanges 12, forming ways diverging toward their ends from an intermediate section, for engagement with the vertical members 13 of the pedestals 14 which connect the boxes with the car body 15, springs 16 being disposed between the tops of the boxes and the pedestals.

As shown in Figs. 1 to 4 inclusive, plates 17 are provided with internally threaded hubs 18, which are screwed on the threaded ends 19 of a shaft 20 extending through the axle 2 concentrically therewith, the plates being held adjustably on the shaft by the locks 21 and fixed to the outer edges of the boxes by the bolts 22. Cups 23 are disposed concentrically with respect to the cones 8, around the respective sets of rollers 9, and are carried by the respective housing bodies 10 through joints formed by the engagement of the spherical surfaces 24 within the bodies with the spherical surfaces 25 on the peripheries of the cups, each spherical surface being a zone extending on opposite sides of a central plane passed through the sphere. In order to facilitate the entry and positioning of the cups within their seats in the housings, the latter are provided with the slots 26 by which the cups are adapted to be entered and turned through 90 degrees to operative position.

A function of the bearing, facilitated by the slots 26, is its adaptability for efficient lubrication, the revolving cones carrying the lubricant in the direction of their diverging elements, and the slots providing ways for ready flow in a reverse direction, to complete a circuit.

The movement of a car around a curve effects a thrust through the axle from the outer wheel, due to the engagement of its flange with the outer rail, and this thrust is transmitted through the cone on the opposite ends of the axle and the corresponding rollers, cup and box to the truck frame connections and car body; the force applied to the box being carried back through the shaft within the axle to the opposite box and cup and therefrom to the corresponding rollers and truck frame connections. The force is thus distributed and taken up by the parts connected with both boxes in turning in either direction. Torsional and vibratory stresses are rectified and the load properly distributed through the rollers by the peculiarities of the construction, including the universal or spherical joints of the cups, and the rocking relation permitted between the pedestals and boxes by their free engagements.

In the modification illustrated in Figs. 5 and 6, the cup 27 has a universal joint with the box 10 which is formed by a spherical surface 24' within the box and the spherical surface 25' on the periphery of the cup, these surfaces being zones on one side of a plane passing through the center of the sphere so that the cup can be moved axially into its seat in the box.

The outer end or face plate 17' of the box is provided with the apertured hub 18', which slips on the shaft 20' passing through the axle 2, and with the peripheral packing ring 17" which fits in the seat 10' in the box, the shaft having the adjustable means 21' locked thereon for holding the plate on the shaft.

The characteristic operation of this form of the device will be understood to be analogous to that previously described.

In the modification illustrated in Figs. 7 and 8, the wheels 1' are fixed to a tubular axle 2' having flanges 2" on their ends through which bolts 28 pass into the wheels. A shaft 20" extends through the axle concentrically and has oppositely disposed, inwardly tapered cones 8' fixed thereon within the wheel hubs, the respective cones carrying conical rollers 9'. Cups 18' are engaged on the respective sets of rollers 9' and have universal connections with the wheels by the provision of spherical surfaces 24" within the latter and the spherical surfaces 25" on the peripheries of the cups, the surfaces lying wholly on one side of a plane passing through the center of the sphere so that the cup can be moved into and out of its seat axially. Hubs 29 are fixed on the ends of the shaft 20" and provide seats 29' having side bearings 29" for engaging the truck frame. Plates 30 containing apertures 30' and felt washers or packing rings 30", by which they are closely engaged on the hubs 29, are connected to the wheels by the bolts 31 to form outer end covers for the cone bearings, and covers 32, containing apertures 32' and felt washers or packing rings 32", by which they are closely engaged on the shaft 20", are fixed to the wheels and axle so as to form inner end covers for the bearings.

It will be understood that while the ball and socket joints and conical rollers are shown and described by way of illustrating my improvements, my invention, as indicated by the claims, is not limited to such specific means for reducing friction and eliminating strains.

While I have shown my invention in its application to tractor mechanism, with the shaft extending through the axle and applied so that it cannot revolve, it will be understood that such invention is not intended to be limited to such use, as the shaft may revolve, or the bearings *per se* may be otherwise applied to various uses.

Having described my invention, I claim:

1. The combination of a pair of substantially concentric members the outer of which is revoluble relatively to the inner, a bearing member fixed to one of said concentric members, a bearing member movably connected to the other of said concentric members, antifriction members between said bearing members, and a wheel fixed to the outer of said concentric members.

2. The combination with a pair of traction wheels, of a revoluble tubular member fixed to said wheels, a member extending through said tubular member, bearing members connected to said tubular member, bearing members connected with said member second named concentrically with said bearing members first named respectively, rollers between said bearing members and means for adjusting the relation of said bearing members to said rollers.

3. The combination of a rotary tubular member, traction wheels fixed to said member, a pair of bearing members having oppositely disposed conical surfaces connected to said member, a shaft extending through said member, bearing members having oppositely disposed conical surfaces connected to said shaft coaxial with the respective conical surfaces first named, conical rollers between respective pairs of conical surfaces and means for adjusting the relation between said bearing members and rollers.

4. The combination of a pair of telescoped members the outer one of which is revoluble relatively to the other, a bearing member having a curved surface fixed to one of said members, a box fixed to the other of said members so as to cover said bearing member, a bearing having a curved surface coaxial with said curved surface first named and a jointed connection with said box, and revoluble members between said surfaces.

5. The combination of a rotary hollow axle having a curved exterior bearing surface, mechanism comprising a shaft extending through said axle, an element having a curved bearing surface connected with said mechanism and concentric with said surface first named, and anti-friction members between said surfaces.

6. The combination of a revoluble hollow axle and wheels fixed thereon, bearing members fixed on said axle, a shaft extending through said axle, journal boxes mounted on the respective ends of said shaft and axle, bearing members having universal joints with said boxes and revoluble anti-friction members disposed between respective pairs of bearing members.

7. The combination of a revoluble tubular member, a substantially concentric member, a journal box fixed relatively to one of said members, a cup connected by means comprising a universal joint with one of said members, a cone connected with the other of said members, and conical rollers between said cup and cone.

8. The combination of a tubular axle and a wheel thereon, a cone fixed on said axle, a shaft extending through said axle, a journal box carried by said shaft, means for adjusting said box on said shaft, a cup having a universal joint connecting it with said box, and conical rollers between said cone and cup.

9. The combination of a tubular axle, wheels fixed on said axle, cone bearing members fixed on said axle, conical rollers engaging said bearing members, conical cups engaging said rollers, journal boxes having jointed connections with said cups, said boxes having seats, truck frame members engaging said seats, a shaft extending through said axle, and means connected with said shaft for holding said boxes thereon.

10. The combination of a pair of concentric members comprising a hollow axle and a shaft extending therethrough one of which is revoluble relatively to the other, a bearing member fixed to one of said members, a bearing member connected by a joint with the other of said members to permit relative movement, and anti-friction means between said bearings members.

11. The combination of an axle, a journal box having a way, anti-friction mechanism comprising a universal joint connecting said box and axle, and a pedestal having a rocking connection with said way.

12. The combination of a hollow shaft, a bearing member connected to said shaft, a second bearing member, anti-friction devices between said bearing members, and means comprising a shaft in said hollow shaft for adjusting the relation between said bearing members.

13. The combination of a plurality of members, a bearing member fixed to one of said members, a housing plate screwed on the other of said members, a housing body to which said plate is bolted, a bearing member having a movable connection with said body, and anti-friction members between said bearing members.

14. The combination of a plurality of members, a bearing member engaged to one of said members, a housing plate engaged to the other of said members, a housing body having an end closed by said plate, a housing plate having means whereby it is fitted on said member first named, said last named plate closing the other end of said body, a bearing member having a turning connection with said body, and anti-friction devices between said bearing members.

15. The combination of a plurality of members, a bearing member engaged to one of said members, a housing plate adjustably connected to another of said members, a housing body to which said plate is connected, a housing plate having means whereby it is mounted on said member first named, and connected to said body, a bearing member having a turning engagement with said body, and anti-friction devices between said bearing members.

In testimony whereof I have hereunto set my name this 16th day of May, 1917.

TRACY V. BUCKWALTER.